April 16, 1968    J. FRANCEL ET AL    3,378,390
COLOR INDICIA FOR GLASS AND METHOD OF APPLYING SAME
Filed Aug. 15, 1963    2 Sheets-Sheet 2

INVENTOR.
JOSEF FRANCEL
BY ALFRED D PINOTTI

E.J. Holler & W.A. Schaich
ATTORNEYS

United States Patent Office 3,378,390
Patented Apr. 16, 1968

3,378,390
COLOR INDICIA FOR GLASS AND METHOD
OF APPLYING SAME
Josef Francel and Alfred D. Pinotti, Toledo, Ohio, assignors to Owens-Illinois, Inc., a corporation of Ohio
Filed Aug. 15, 1963, Ser. No. 302,342
14 Claims. (Cl. 117—43)

ABSTRACT OF THE DISCLOSURE

This invention relates to a method of and compositions for applying an integral permanent indicia to continuously drawn lengths of glass tubing or rod without deleterious effects upon their physical or chemical properties.

The present invention relates to glass generally and more particularly to an adherent colored indicia for application to the glass, including methods and techniques for applying same.

It is frequently desirable for glass articles to bear an indicia or mark of the producer or manufacturer of the glass. With continuously drawn sheet, tube and rod forms of glass, the application of a mark or indicia is quite difficult since the length of material is usually subdivided into smaller lengths, and even these lose their identity in subsequent additional forming operations, e.g., forming of vials, ampoules, etc.

In blow glass articles and even in certain forms of sheet glass production, it is not too difficult to apply a maker's mark. Thus, in the manufacture of blown containers, the mold itself may be provided with a mark, symbol, name or indicia of the manufacturer which is inherently transferred to the glass article formed therein. However, in drawn tubing and rod, with which operations the particular operation will be described, the application of an indicia is quite difficult for several reasons. In the first place, the form of the product is generally small as compared to a blown container and, in addition, it is produced continuously by a drawing operation rather than by an individual molding or blowing operation. It has been suggested that manufacturers adopt an identifying stripe or indicia applied so as to appear throughout the length of the continuously drawn tubing or rod. Unfortunately, such has not proven entirely satisfactory since the tubing and/or rod is drawn at a considerable lineal rate of speed whereby known staining compositions do not satisfactorily form adherent, integral and lasting deposits or films upon the rod or tubing. It has also been suggested that stripes of frit or color glass be applied at the forming head or mandrel. This, likewise, has not proven satisfactory since stresses have been found to be developed in the tubing, detracting from the strength and causing difficulty in forming multiple containers from single cut lengths. Others have adopted the procedure of applying colored glass fibers of the same composition as the base glass as the tubing or rod comes off the mandrel, for example, of the conventional Danner tubing operation. Unfortunately, this has been found to interrupt the thermal equilibrium desirably maintained for a brief interval upon emergence of the formed catenary of tubing or rod from the Danner head or mandrel.

It is, of course, most desirable that any permanent indicia applied to a tubing or rod should be relatively observable when examined, yet be relatively inconspicuous on a casual glance.

With the foregoing general introduction, it may be stated that it is an object of the present invention to provide a method of applying an integral permanent indicia in continuous fashion to a continuously drawn length of tubing or rod without otherwise detracting from the physical properties of the tubing or rod.

It is another object of the present invention to provide a method of applying an observable, yet inconspicuous, coloring indicia in the form of at least one continuous longitudinal stripe disposed exteriorly along the length of a continuously drawn length of glass, tubing or rod.

It is also an object of the present invention to provide such a method which yields an indicia-bearing length of tubing or rod, which indicia is substantially permanent and resistant to physical abrasion and a substantial variety of alkali and acid solutions which the tubing might be expected to encounter.

It is yet another object of the present invention to provide such a method which yields an indicia-bearing length of tubing which is capable of deformation in the formation of the tubing or rod into other forms, such as ampoules, vials, pipettes, thermometers, and the like, each bearing an identifying marking.

It is still another object of the present invention to provide a particular composition which is of utility as a coloration-imparting indicia for glass rod and tubing; said indicia being inherent, continuous and of desirable specular reflection.

It is yet another object of the present invention to provide an indicia-imparting composition which is easily applied to the continuously drawn glass tubing or rod even at high rates of lineal draw and which composition is relatively stable for operable periods of time.

It is a particular object of the present invention to provide such a composition which is possessed of a considerable concentration of the color indicia component, yet which converts to an integral bonded stripe or layer with a minimum of difficulty, yielding highly specular reflections and adherent character.

The foregoing, as well as other objects of the present invention, will become apparent to those skilled in the art from the following detailed description taken in conjunction with the annexed sheets of drawing on which there is presented, for purposes of illustration only, an apparatus representing a preferred technique and/or apparatus for applying the coloring indicia composition of the present invention. The foregoing objects will also become more meaningful from the following detailed description, including the recitation of preferred examples illustrating a preferred mode and manner of preparing the coloring composition and the preferred manner of applying same to a continuously drawn length of tubing and/or rod formed of glass.

*In the drawings*

Figure 1:
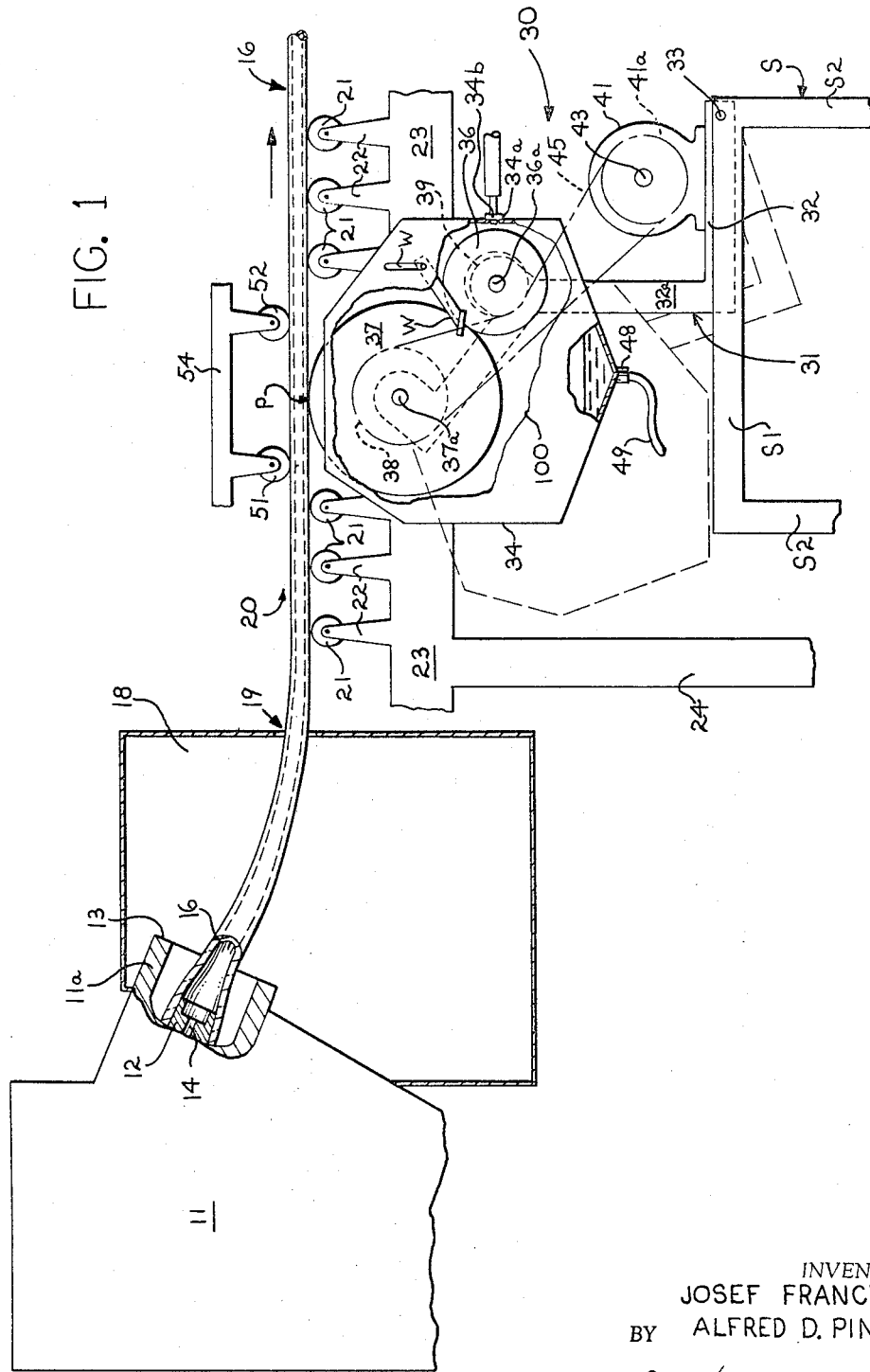
FIG. 1 is a schematic side elevation view, partly broken away, of an apparatus which may be used for applying a coloring or indicia solution coating to glass tubing in accordance with an embodiment of the present invention.

In its simplest embodiment, the present invention envisions the application as a generally narrow stripe or deposit of a coloring composition composed of a salt-like cobalt compound upon a continuously drawn length of tubing soon after it emerges from the forming head and while it contains an effective amount of residual heat sufficient to drive off the heat decomposable constituent of the coloring indicia composition whereby a solid deposition of the composition occurs; the latter being integrally bonded to the glass substrate to form a generally permanent coloration indicia upon the glass substrate as a continuous linear stripe. It will be appreciated, of course, that one or more stripes may be applied in accordance with the techniques as described hereinafter.

The coloring or indicia-imparting composition, in accordance with the present invention, preferably comprises an aqueous solution of a cobalt salt of carboxylic acid as herein defined.

The cobalt compound constituting a salt of a carboxylic acid or being of salt-like character may be applied as an aqueous solution or as a paste prepared by forming an alcoholic aqueous solution of the cobalt compound, for example, followed by a heating to drive off the alcohol and some of the water, or in other words, evaporate the solution to a volume wherein the concentration of the cobalt is higher. The cobalt salt-like compounds within the purview of the present invention include cobalt salts of the carboxylic acids including acetic, propionic, butyric, valeric, caproic, enanthic, caprylic, pelargonic, capric, undecylic, lauric, myristic, palmitic, stearic, oleic, erucic, linoleic, linolenic, oxalic, malonic, succinic, glutaric, adipic, pimelic, suberic, azelaic, sebacic, malic, maleic, fumaric, tartaric, citric, benzoic, substituted benzoic, phthalic, etc. Most ideally, the lower monocarboxylic acid salts of less than 6 carbon atoms are preferred by reason of their higher water solubility and convertibility into adherent, coherent, film-like layers. These include cobalt acetate, cobalt propionate $Co(C_3H_5O_2)_3 \cdot H_2O$; cobalt butyrate $Co(C_4H_7O_2)_2 \cdot XH_2O$; cobalt oxalate $CoC_2O_4$; and cobalt nitrate $Co(NO_3)_2 \cdot 6H_2O$. Cobalt acetate tetrahydrate having the formula $Co(C_2H_3O_2)_2 \cdot 4H_2O$ is the most preferred of the compositions herein described. Cobalt acetate tetrahydrate is available as a powder but it is relatively soluble in water or in alcohol, such as methanol, ethanol or butanol.

The cobalt salts of some of the longer chain acids are also of utility as indicia or colorant-imparting compounds in the practice of the present invention. Such longer chain fatty acid salts include cobalt linoleate $Co(C_{18}H_{31}O_2)_2$; cobalt oleate $Co(C_{18}H_{33}O_2)_2$; and the like. Cobalt orthotitanate $Co_2TiO_4$ is another salt-like compound which may be utilized in the practice of the present invention. Cobalt salts of inorganic acids which are water soluble may be used including cobalt nitrate and cobalt fluoride. Cobalt in the combined form of a derivative of the beta-diketones is also representative of a cobalt compound of salt-like character within the purview of the present invention. The beta-diketones in the enol form have the hydrogen atom of the hydroxyl group replaced by cobalt to yield a complex product in which the cobalt is co-ordinated. Examples of the beta-diketones are acetylacetone and acetoacetic ester, etc. The cobalt salt of such materials may be prepared by reacting, for instance, basic cobalt carbonate with 2,4-pentanedione. The salt-like cobalt material may also be prepared by reacting the cobalt carbonate with distilled acetylacetone and a slightly acid aqueous solution followed by an ammonia treatment. This reaction is described in more detail in vol. II, "Inorganic Synthesis," by Fernelious (1946).

A further cobalt complex may be prepared by reacting the acetoacetic ester with a cobalt carbide. See, in this regard, "Organic Chemistry" by Frank Whitmore, 2nd ed., Van Nostrand Press (1951).

The naphthenate salts of cobalt are also, broadly speaking, cobalt compounds which may be used in the practice of the present invention. Other cobalts, salt-like in character, will be suggested from the foregoing disclosure.

The indicia-imparting coloring compound is, as indicated, preferably applied as a continuous stripe to the surface of a preformed continuous length of glass tubing or rod, while the latter is in a particular range of elevated temperatures whereby this temperature effectually evaporates the liquid component of the cobalt composition and converts the solid component to an adherent oxide, exhibiting film-like character of appreciable visual specular reflection.

Figure 2:
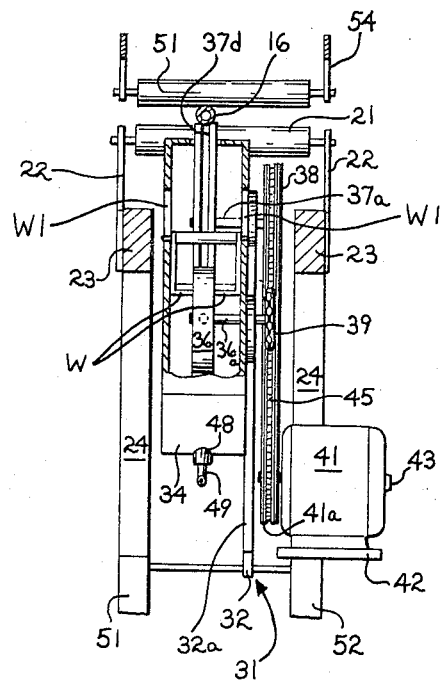
FIG. 2 is an end view, but partially in section, taken from the right of the assembly shown in FIG. 1.

One technique for applying the cobalt composition as an aqueous solution or relatively thick, flowable paste is illustrated in FIGS. 1 and 2. In FIG. 1, the numeral 11 identifies a delivery portion of the glass melting furnace embodying a Danner forming head 11a including a rotating mandrel 12 about which molten glass is allowed to be formed and thence drawn from the outlet 13 of the furnace 11. The mandrel 12 includes an axial passageway 14 for air or other suitable gas, whereby a hollow cylindrical tubing 16 is drawn from the end of the mandrel 12. In the absence of the passageway 14, a length of solid or rod-like length is formed instead of the hollow tubing 16. From the mandrel, the tubing 16 passes through a muffler-like enclosure 18, passing through an outlet 19 onto the alleyway 20 composed of plurality of horizontally spaced rollers 21 mounted transversely of the continuously drawn length of glass tubing 16 and providing rolling support therefor. The muffle-like enclosure 18 provides a protective heat retentive chamber for the tubing as it passes downwardly in a form of catenary curve to achieve its final disposition in the form of a straight continuous length as it approaches and passes on to the rollers, referred to hereinabove. The rollers 21 are rotatably mounted on standards 22, upstanding from a horizonal support 23 and ultimately resting on vertical legs 24. The muffle enclosure 18 insures the maintenance of a particular and precise temperature condition as the tubing emerges from the mandrel in semi-spiral fashion engendered by the rotation by the mandrel 12. This temperature gradually lessens as the tubing emerges therefrom and assumes the horizontal position on the alleyway. In accordance with the present invention, very shortly after the tubing has reached its horizontal path, it is provided with a stripe of a coloring indicia applied as a deposit by means, for example, of the apparatus 30. The tubing at such location still retains sufficient heat to activate the cobalt coloring composition. The apparatus 30 is carried on a support framework 31 including a vertical arm 32a and a horizontal arm 32 pivotally mounted as at 33. The vertical arm 32a carries a housing 34. The pivotable mounting 33 is mounted in a lower support S composed of a horizontal table S1 and vertical support legs S2. The support structure 31 is, by appropriate means, pivotable between the positions shown in solid line and the position shown in dotted outline in FIG. 1. Mounted for rotation in the housing 34, as can be seen by the broken away portion 100, are a color wheel 36 and, tangentially in contact therewith, an application wheel 37. The wheels are mounted for rotation on axles 36a and 37a, respectively. A drive sprocket 38 is coaxially mounted on shaft 37a, while similar drive sprocket 39 is coaxially mounted on shaft 36a. A motor 41 is mounted on a plate 42, secured to frame member 32. A sprocket 41a is mounted coaxially on motor driveshaft 43. An endless chain 45 extends around the drive sprocket 41a of the motor 41 and about the drive sprocket 38, passing underneath the drive sprocket 39, in the manner shown, whereby the color wheel 36 and the application wheel 37 are driven independently at a speed as determined by the rotation of the motor.

The housing 34 has an opening 34a into which extends a gun 34b for spray applying the indicia or coloring compound against the color wheel 36. The liquid color composition is then transferred to the application wheel 37 which in its upper position, as shown in solid outline in FIG. 1, brings it into contact with the lowermost surface of the tubing 16 as it passes along the rollers 21. Wipers W, adjustably mounted as at slot W1 on either side of the wheels 36 and 37, serve to physically remove the excess color from the wheels at the transfer or tangent point between the color wheel 36 and the application wheel 37. Excess solution collects in the bottom of the framework 34 and is drawn off via the outlet 48 and tubing 49 to a suitable reservoir from which it may be reintroduced to the spray apparatus, not shown, for introduction through the nozzle 43 to the color wheel 36.

Since at high rate of speed of draw the horizontal span of continuously traveling tubing in the alleyway 20 may be subject to vibration, it is most desirable to employ a set of spaced rollers 51 and 52 which are rotatably mounted to depend from a structure 54. The rollers 51 and 52 are spaced upstream and downstream as it were with respect to the point of application P of the coloration indicia composition via the wheel 37.

The tubing, as it passes continuously across the rollers 21 and therebeyond, is rotating slightly by reason of the rotation of the mandrel 12. Accordingly, the twist or rotation may be utilized in order to apply a plurality of stripes of the coloring compound by, for example, utilizing a spaced plurality of the apparatus identified by the numeral 30.

Figure 3:
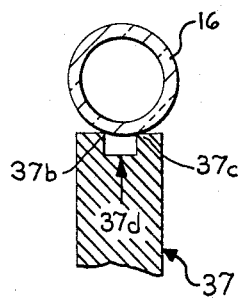
FIG. 3 is an enlarged view showing the glass tubing in contact with the color applying wheel as shown in FIG. 2.

Alternatively, the application wheel 37 may be grooved as at 37d (FIG. 3) whereby the wheel contacts the tubing at two points, namely, 37b and 37c, providing with one application, two parallel spaced stripes of the coloring or indicia-imparting cobalt compound.

While the apparatus as shown in FIGS. 1 and 2 illustrates schematically one technique which may be utilized in applying a deposit of the desired cobalt solution upon the continuously moving glass tubing and/or rod, it will be appreciated that other application techniques may be utilized, and particularly the color solution, instead of being sprayed on the color wheel, may be applied by a reservoir chamber into which the color wheel passes in its rotation to thereby pick up an appropriate amount of color. Furthermore, it is envisioned that the coloring solution may be directly applied to the glass tubing, utilizing a spray gun with appropriate control means for the orifice.

Example I

A cobalt indicia-imparting composition, in accordance with the present invention, is prepared as follows: To 30 parts of distilled water by volume, there are added 15 parts by weight of cobalt acetate tetrahydrate

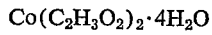

$Co(C_2H_3O_2)_2 \cdot 4H_2O$ and 20 parts by volume of methyl alcohol $CH_3OH$. This mixture forms an aqueous solution of a viscosity slightly thicker than water which possesses the cobalt acetate in the concentration of about 0.27 gram per milliliter. It is applied to continuously drawn tubing (10.0 millimeters outside diameter and 0.40 millimeter wall thickness) while the glass tubing is maintained at temperature of 1050° F. The heat of the glass dried the applied solution to a non-tacky state. The resulting film was of uniform character, specular to the eye and integrally bonded to the glass substrate. A coating in accordance with the above formulation will form onto the glass at temperatures ranging from about 270° F. (390° C.) to about 1400° F. (760° C.). Most preferably, however, a temperature of 1000° F. (538° C.) to 1100° F. (594° C.) is maintained in the interest of uniformity and continuity of the film-like deposition formed at the temperature range involved.

Example II

Another coloring indicia-imparting material may be prepared by combining 20 grams of cobalt nitrate hexahydrate $Co(NO_3)_2 \cdot 6H_2O$ and 30 grams of a molar solution of nitric acid and 50 grams of distilled water. This is applied to continuously drawn tubing held at 975° F., whereupon drying occurred and a uniform film-like stripe was observed. The film applied as just described was found to be generally uniform, possessed of good adhesion and scratch resistance. The film was integrally attached to the glass substrate.

While it is not intended to be bound by theory, it is believed that the cobalt component of the salt solutions decomposes under the conditions of application to form a cobaltous-cobaltic oxide $Co_3O_4$ and that the latter becomes chemically bonded to the glass.

The function of the alcohol in the aqueous solution of cobalt salt is not completely understood. However, experience demonstrates that the thermal shock and consequent breaks in the continuous length of drawn glass tubing are considerably reduced by the inclusion of the alcohol. Additionally, it is envisioned that the alcohol, e.g., methanol, lowers the surface tension of the cobaltous solution, thereby improving the wetting of the contact surface.

Example III

Another solution of a cobalt salt-like compound is formed by combining 20 grams of cobalt acetate tetrahydrate with 5 grams of cobaltous nitrate together with 50 milliliters of distilled water and 0.3 milliliter of a nonionic wetting agent, e.g., Pluronic, for example, manufactured by the Wyandotte Chemical Company. This reduced the viscosity of the solution from 72 to 30 dynes per centimeter. Other wetting agents which can be used include Hyonic PE–225, a polyoxyethylene ester, manufactured by Nopco Chemical. Still another includes Neutronyx–611 which is an alkyl phenol polyglycol ether containing 9 mols of ethylene oxide and is produced by Onyx Chemical Corporation.

Example IV

A preferred indicia-imparting coloring cobalt compound of the present invention is prepared as follows: 2.2 pounds by weight of methanol is placed in a container and there is added, with stirring, 8.3 pounds by weight of powdered cobalt acetate tetrahydrate. The mixing container is provided with an inlet beneath the surface of the contents whereby an added gas may be introduced through the solution. While stirring, ammonia is introduced to the inlet and thereby bubbled through the solution, as described, until the specific gravity thereof has been decreased to approximately 9–10° Baumé. At this point, the solution will measure about 45–60° C. and the volume will measure 2.1 gallons. Thereafter, this solution is heated until the volume has been reduced about one gallon. The resulting viscous solution will contain about one gram of cobalt per milliliter of solution. When applied in the manner described hereinabove, utilizing the apparatus illustrated in FIGS. 1 and 2, there is achieved a particularly uniform, coherent, film-like deposit of the coating which, upon drying by the residual heat in the tubing in the neighborhood of 1000–1100° F., yields a highly reflective stripe which is resistant to physical abrasion and likewise to alkali solutions and concentrations of from 1% to 4% (1.4° Bé.–4.5° Bé. sodium hydroxide). The tubing bearing the stripe of the just described composition is capable of being formed into containers, such as vials and ampoules, without destruction or deterioration of the applied identifying stripe in the body of such products.

Example V

Another cobalt indicia-imparting composition of the present invention may be prepared as follows: 4.5 pounds (0.55 gallon) of water are located in a mixing container, to which is added, while stirring, 2.3 pounds of powdered cobalt acetate tetrahydrate. After stirring for about 10 minutes, 2.4 pounds (0.36 gallon) of methanol is added and stirring is continued until all of the cobalt acetate tetrahydrate has been dissolved. The resulting solution may be used as an indicia-imparting cobalt composition to continuously moving elevated temperature glass tubing or rod. Utilizing the foregoing compositions, stripes which are adherent and particularly bonded to the glass tubing substrate may be applied at drawing rates of from 50 to 650 feet per minute. Generally, at speeds of from 3 to 600 feet per minute, the coatings of the present invention achieve their highest prominence in terms of specular reflection.

The cobalt salt-like compounds in the form of aqueous solutions and/or mixtures are desirably applied while the glass measures a temperature of from about 750° F. to 1400° F. Most ideally, in terms of uniformity, continuity, and specular reflection, as well as adherent properties, the coatings should be most carefully controlled for application while the glass substrate measures from about 950 to 1200° F. The latter range of temperature yields film-like stripe coatings which are more permanent and therefore more desirable in producing indicia-bearing tubing, etc., which can be formed into ampoules, vials, thermometers, etc., without destruction of the indicia stripe in the body of such products.

While it is not intended to be bound by theory, it is believed that the bubbling of the ammonia, through the cobalt solution, as described in certain of the foregoing examples, is yieldative of a hexamine complex, having the formula $Co(NH_3)_6 \cdot (C_2H_3O_2)_2$. Most ideal results have been achieved with an aqueous cobaltous compound which was modified by the bubbling of the ammonia therethrough, achieving, it is believed, as indicated hereinbefore, a hexamine complex. One of the results of the formation of the ammonia complex is that a higher concentration or intensity of the cobalt is achieved whereby sharpness of line detail and improved, e.g., more dramatic, specular reflection is achieved.

The aqueous methanol solutions of the cobalt salt-like compound may be diluted or concentrated by heating the solution to evaporate the alcohol solvent or, in turn, may be diluted by further addition of the alcohol to meet particular requirements involving changes in the several variables involved, e.g., the particular cobalt compound, the rate of tube draw, the temperature of the glass and the character of the line desired.

While specific formulations and process details have been disclosed herein in conformity with the patent statutes, it will be appreciated by those skilled in the art that modifications may be resorted to without departing from the spirit of the present invention, unless violative of the scope thereof as defined in the appended claims.

We claim:

1. The method of affixing an identifying indicia onto glass tubing, rod and the like as it is continuously drawn from a forming head, mandrel or the like, which comprises continuously applying to the tubing, while hot, a narrow endless stripe of a liquid including one of the group water and alcohol and mixtures thereof together with a cobalt compound derived from one of the group consisting of carboxylic acids, nitric acid, fatty acids, naphthenic acids, the titanates, the beta diketones and mixtures of such compound derivatives, said derivative compound being convertible by the residual heat in said tubing, rod or the like to an oxide in the form of a continuous film strip securely attached to the glass surface.

2. The method as claimed in claim 1, wherein said cobalt compound is cobalt acetate tetrahydrate.

3. The method as claimed in claim 2, wherein said cobalt compound is in the form of a hexamine complex.

4. The method as claimed in claim 1, wherein said liquid is treated by bubbling ammonia therethrough.

5. The method as claimed in claim 4, wherein the stripe is applied while the tubing measures 750 to 1400° F.

6. The method as claimed in claim 5, wherein said temperature measures 950 to 1200° F.

7. The method as claimed in claim 1, wherein said cobalt compound is in the form of a hexamine complex.

8. The method as claimed in claim 1, wherein the liquid includes water and alcohol.

9. The method as claimed in claim 8, wherein the liquid includes butanol as the alcohol.

10. The method as claimed in claim 1, wherein said liquid is heated after bubbling with ammonia to reduce the volume of liquid, thereby increasing the concentration of cobalt.

11. A liquid coating composition for application as an identifying stripe to continuously drawn glass tubing, rod and the like while at elevated temperature, said liquid coating including one of the group water and alcohol and mixtures thereof together with a cobalt complex formed by ammoniating a cobalt compound derived from one of the group consisting of carboxylic acids, nitric acid, fatty acids, naphthenic acids, the titanates, the beta diketones and mixtures of such compound derivatives.

12. A coating composition as claimed in claim 11 in which said cobalt compound is a hexamine complex.

13. A coating composition as claimed in claim 11, wherein said liquid includes water and butanol.

14. A coating composition as claimed in claim 13, which includes a non-ionic wetting agent.

References Cited

UNITED STATES PATENTS

| | | | |
|---|---|---|---|
| 2,688,565 | 9/1954 | Raymond | 117—124 |
| 2,975,076 | 3/1961 | Saunders et al. | 117—124 |
| 3,078,693 | 2/1963 | Lytle | 117—124 X |
| 3,185,586 | 5/1965 | Saunders et al. | 117—54 |
| 3,223,498 | 12/1965 | Davidson | 65—60 X |

ALFRED L. LEAVITT, *Primary Examiner.*

H. COHEN, *Assistant Examiner.*